(12) United States Patent
Cahen et al.

(10) Patent No.: US 10,231,573 B2
(45) Date of Patent: Mar. 19, 2019

(54) SIMPLE ERGONOMIC USER-INTERFACE FOR A BEVERAGE MACHINE

(71) Applicant: NESTEC S.A., Vevey (CH)

(72) Inventors: Antoine Cahen, Lausanne (CH); Pietro Cacace, Orbe (CH)

(73) Assignee: Nestec S.A., Vevey (CH)

( * ) Notice: Subject to any disclaimer, the term of this patent is extended or adjusted under 35 U.S.C. 154(b) by 154 days.

(21) Appl. No.: 15/107,201

(22) PCT Filed: Dec. 12, 2014

(86) PCT No.: PCT/EP2014/077494
§ 371 (c)(1),
(2) Date: Jun. 22, 2016

(87) PCT Pub. No.: WO2015/096998
PCT Pub. Date: Jul. 2, 2015

(65) Prior Publication Data
US 2017/0007068 A1    Jan. 12, 2017

(30) Foreign Application Priority Data
Dec. 23, 2013    (EP) ..................................... 13199284

(51) Int. Cl.
*A47J 31/00* (2006.01)
*A47J 31/52* (2006.01)
(Continued)

(52) U.S. Cl.
CPC ........... *A47J 31/52* (2013.01); *A47J 31/4407* (2013.01); *G07F 9/026* (2013.01); *G07F 13/06* (2013.01); *A47J 31/00* (2013.01)

(58) Field of Classification Search
CPC .......... A47J 31/00; A47J 31/002; A47J 31/52; A47J 31/58; A47J 31/4407
(Continued)

(56) References Cited

U.S. PATENT DOCUMENTS 4,377,049 A    3/1983  Simon et al.
4,554,419 A    11/1985 King et al.
(Continued)

FOREIGN PATENT DOCUMENTS

CN    101226659 A    7/2008
CN    102089733 A    6/2011
(Continued)

OTHER PUBLICATIONS

Japan Patent Office Communication for Application No. 2016-539285, Dispatch No. 455641, Dispatch Date Oct. 30, 2018, 7 pages.

*Primary Examiner* — Reginald L Alexander
(74) *Attorney, Agent, or Firm* — K&L Gates LLP

(57) ABSTRACT

A beverage preparation machine (1) comprises a user-interface (10, 10', 20, 30, 40, 50) that has: a generally peripheral illuminatable arrangement (11, 11', 21, 31, 41, 51) formed of illuminatable parts (11A-11F, 11A'-11H', 21A-21G, 31A-31F, 41A-41B, 51A-51H, 51X) and extending around an inner portion (110,120); and a control arrangement (100,105) for activating and deactivating an illumination of the illuminatable parts. The control arrangement (100,105) has at least one configuration for activating part of the illuminatable parts (11A-11F, 11A'-11H', 21A-21G, 31A-31F, 41A-41B, 51A-51H, 51X), for instance to successively activate consecutive parts (11A-11F, 11A'-11H', 21A-21G, 31A-31F, 41A-41B, 51A-51H, 51X) in a turning sequence about the inner portion (110,120) and optionally either deactivate all the parts simultaneously after activation of all the parts or successively deactivate previously activated parts at the same pace as the activation pace or at a lower pace.

16 Claims, 3 Drawing Sheets

(51) Int. Cl.
*A47J 31/44* (2006.01)
*G07F 9/02* (2006.01)
*G07F 13/06* (2006.01)

(58) Field of Classification Search
USPC ............... 99/280, 281, 282, 283, 285, 279
See application file for complete search history.

(56) References Cited

U.S. PATENT DOCUMENTS

| | | | |
|---|---|---|---|
| 6,182,555 B1 | 2/2001 | Scheer et al. | |
| 2011/0168026 A1* | 7/2011 | Cahen | A47J 31/4407 |
| | | | 99/280 |
| 2013/0062176 A1* | 3/2013 | Schuh | H03K 17/962 |
| | | | 200/5 A |
| 2014/0352549 A1* | 12/2014 | Upston | A47J 37/085 |
| | | | 99/334 |
| 2016/0150911 A1* | 6/2016 | Upston | A47J 31/46 |
| | | | 99/285 |

FOREIGN PATENT DOCUMENTS

| | | |
|---|---|---|
| CN | 102741889 A | 10/2012 |
| CN | 102946775 A | 2/2013 |
| EP | 2528044 | 11/2012 |
| JP | 2006517167 A | 7/2006 |
| JP | 2012518508 A | 8/2012 |
| JP | 2013540551 A | 11/2013 |
| WO | 2010037806 | 4/2010 |

* cited by examiner

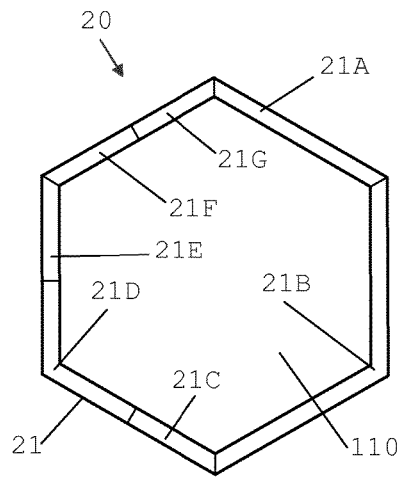
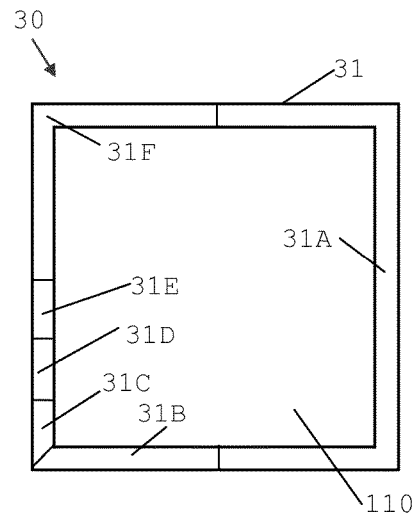
Fig. 2
Fig. 3
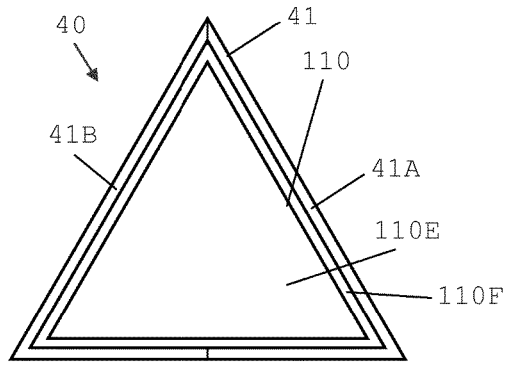
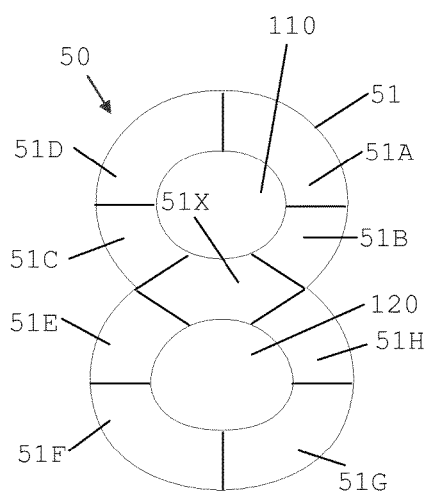
Fig. 4
Fig. 5

SIMPLE ERGONOMIC USER-INTERFACE FOR A BEVERAGE MACHINE

CROSS REFERENCE TO RELATED APPLICATIONS

The present application is a National Stage of International Application No. PCT/EP2014/077494, filed on Dec. 12, 2014, which claims priority to European Patent Application No. 13199284.4, filed Dec. 23, 2013, the entire contents of which are being incorporated herein by reference.

FIELD OF THE INVENTION

The field of the invention pertains to beverage preparation machines having a user-friendly and ergonomic user-interface for indicating information to a user. For example, the beverage preparation machines may use receptacles, such as capsules, of an ingredient of the beverage to be prepared, such as machines for preparing the beverage by circulation of a liquid into the ingredient receptacle and centrifugation thereof, typically to brew the beverage in the ingredient receptacle and extract the beverage therefrom.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavouring ingredient, within an enclosing packaging of any material, such as an airtight or air-permeable packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Typically, such brewing devices comprise two parts relatively movable from a configuration for inserting/removing a capsule to a configuration for brewing the ingredient in the capsule. The actuation of the movable part of the brewing device may be motorized. Such a system is for example disclosed in EP 1 767 129. Other examples of brewing devices are disclosed in WO 2009/043630, WO 2005/004683 and WO 2007/135136.

The preparation of a beverage by using centrifugation is also known. Such beverage preparation includes: providing a beverage (flavoring) ingredient, e.g. as powder and/or leaves, in a receptacle, e.g. in a capsule; circulating liquid into the receptacle and rotating the receptacle at sufficient speed to ensure interaction of the liquid with the ingredient while creating a gradient of pressure of liquid in the receptacle. Such pressure increases gradually from the centre towards the periphery of the receptacle. As liquid traverses the ingredient, e.g. coffee bed, extraction of the ingredient, e.g. coffee compounds, takes place and a liquid extract is obtained that flows out at the periphery of the receptacle. WO2008/148601 describes a possible example of a device using such centrifugal principle. In this case, the ingredient receptacle is a sealed capsule which is opened before its use. Hot water is fed in the centre of the capsule via a water interfacing part comprising a water injector aligned in the rotation axis. The receptacle is held in a capsule holder which is rotated by means of a rotary motor. Both the liquid interfacing part and the capsule holding part are mounted along roller bearings. The beverage is extracted from the capsule by a plurality of peripheral needles that creates openings through a lid of the receptacle. As the capsule is centrifuged about its rotation axis, hot water passes through the beverage ingredient, interacts with it to produce a liquid extract and the resulting liquid extract traverses, under the effect of the centrifugal forces, the peripheral openings and is projected against an impact wall of the collector. The liquid extract, thus constituting the beverage, is then drained through a beverage duct of the device and collected into a recipient such as a cup. WO2008/148650 further describes a device wherein a flow restriction is created downstream of the receptacle, in particular a capsule, for example, by a valve system which opens or enlarges under the pressure created by the centrifuged liquid leaving the receptacle. The valve system can be formed by a mobile restriction part of the device which is elastically urged against a rim portion of the capsule. U.S. Pat. No. 5,566,605 relates to a centrifugal type extraction cell having a deformable sealing joint for hot beverage preparation machine. The cell comprises a drum and a cover defining with the drum an internal volume. The cover is connected to the drum by attachment ears that engage in ramps. In these prior art devices, the water interfacing part which supplies the receptacle with water and the holding part which holds the receptacle are rotatable along frame portions of the device which are secured together by a closure mechanism such as a bayonet system or the like. The holding part is generally mounted on a frame part via at least one roller bearing. The liquid interfacing part is also generally part of a frame part also mounted along at least one roller bearing. When the device is rotated at high speed during centrifugation, the liquid extract creates important axial and radial forces which tend to separate these rotating parts.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,645,230, U.S. Pat. No. 5,685,435, U.S. Pat. No. 5,731,981, U.S. Pat. No. 5,836,236, U.S. Pat. No. 5,959,869, U.S. Pat. No. 6,182,555, U.S. Pat. No. 6,354,341, U.S. Pat. No. 6,759,072, U.S. Pat. No. 2007/0157820, WO 97/25634, WO 99/50172, WO 2004/030435, WO 2004/030438, WO 2006/063645, WO 2006/090183, WO 2007/003062, WO 2007/003990, WO 2008/104751, WO 2008/138710, WO 2008/138820 and WO 2010/003932.

SUMMARY OF THE INVENTION

It is therefore a preferred object of the present invention to improve at least one characteristic of a beverage machine interface selected from its ergonomics, interactivity, intuitiveness, user-friendliness and simplicity, e.g. of an interface of a coffee, chocolate, cacao, milk, soup or tea preparation machine.

The invention thus relates to a beverage preparation machine. The machine may have: a water source, a beverage preparation unit and an outlet for delivering a beverage to a beverage dispensing area.

For instance, the machine is a coffee, tea, chocolate, cacao, milk and/or soup machine, such as a machine for preparing a beverage by passing hot or cold water or another liquid through a capsule containing an ingredient of the beverage to be prepared, such as ground coffee. Examples of such machines are disclosed in WO 2007/042415, WO 2007/042414, WO 2007/134960, WO 2009/074550, WO 2009/130099, WO 2013/127476 and the references cited therein.

For instance, the beverage machine has a receptacle holding unit for preparing a beverage from at least one ingredient and dispensing such prepared beverage. For instance, the machine is configured to prepare coffee, tea, chocolate, cacao, milk and/or soup. For example, the machine is arranged for preparing within a beverage processing module that includes the receptacle holding unit, a beverage by passing hot or cold water or another liquid through a receptacle held in the unit, such as a held capsule, containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 250 ml, e.g. the volume for filling a cup or mug, depending on the type of beverage. Formed and dispensed beverages may be selected from ristrettos, espressos, lungos, cappuccinos, café latte, americano coffees, teas, etc. . . . . For example, a coffee machine may be configured for dispensing espressos, e.g. an adjustable volume of 20 to 60 ml per serving, and/or for dispensing lungos, e.g. a volume in the range of 70 to 200 ml per serving.

In an advantageous embodiment, the beverage machine is of the type that combines the ingredient by centrifugation, for instance as disclosed in WO 2008/148601, WO 2008/148604, WO 2008/148646, WO 2008/148650, WO 2008/148656, WO 2009/106175, WO 2009/106598, WO 2010/063644, WO 2010/066736, WO 2010/089329, WO 2011/023711, PCT/EP13/077276 and PCT/EP13/077275. Hence, the machine may include an ingredient combination chamber, e.g. for housing an ingredient capsule, into which a liquid is injected and which undergoes centrifugation about a centrifugation axis to combine the ingredient and the liquid. The ingredient combination chamber can be opened and closed and, for combining the ingredients, rotated.

The machine of the invention comprises a user-interface that has: a generally peripheral illuminatable arrangement formed of illuminatable parts and extending around an inner portion; and a control arrangement for activating and deactivating an illumination of the illuminatable parts, such as a programmable control arrangement. For instance, the control arrangement comprises a printed circuit board PCB and a controller e.g. a controller connected to the PCB by connectors. The PCB may formed of a single printed substrate or several juxtaposed or distant printed substrates that are electrically or optically or otherwise connected. Optionally, the control arrangement controls other functions of such machine, such as an IT module, a pump, a thermal conditioner and/or a motorization of a preparation unit.

For instance, the user-interface is on a top part or front part or side part of such machine.

In accordance with the invention, the control arrangement has at least one configuration for activating only part of the illuminatable parts.

The illuminatable parts may include one or more spots, such as round or polygonal spots, positioned along the generally peripheral illuminatable arrangement and/or one or more elongated segments extending along the generally peripheral illuminatable arrangement. The elongated segment(s) comprise segments that can be selected from segments that are:

curved segments, such as segments that extend generally along a circular sector and/or segments that extend generally along an elliptic sector;

straight segments;

angled segments;

segments that extend along an entire straight side of the peripheral illuminatable arrangement;

angled segments that extend along a plurality of straight sides of the peripheral illuminatable arrangement, such as angled segments that extend over an entire straight side and/or over less than an entire straight side of the peripheral illuminatable arrangement and/or segments that extend along only two straight sides and/or along more than two sides of the peripheral illuminatable arrangement; and segments that extend over a fraction of an overall length of the peripheral illuminatable arrangement, which fraction corresponds to about a half or a third or a fourth or a fifth or a sixth or a seventh or an eight or a ninth or a tenth or a twelfth or a twenty-fourth of the overall length.

The generally peripheral illuminatable arrangement may extend around a single inner portion or several inner portions, such as a pair of inner portions for instance so that the generally peripheral illuminatable arrangement is generally 8-shaped around and between the spaced apart inner portions. A single inner portion can be made of a plurality of sections, such as a plurality of active interface parts or a plurality of inactive interface parts or a combination of at least one active interface part and at least one inactive interface part. For instance, such active interface part(s) are in the form of user-selector(s). Inactive user-interface part(s) can be in the form of housing section(s). The housing sections belonging the interface's housing and/or to an external machine housing.

The inner portion can be: an active portion, such as a selector or a plurality of selectors, for instance in the form of one or more push-buttons; and/or a passive portion such as a housing section.

The generally peripheral illuminatable arrangement may include one or more of the following features:

a light spreading window such as a translucent window for spreading light emitted by the light emitter(s);

a light transmitting window such as a transparent window for revealing a shape of the light emitter to a user;

a plurality of light emitters comprising light emitters of a single colour or light emitters of different colours, such as groups of light emitters of different colours, such as colours selected from white, yellow, orange, red, green, blue and pink, and mixture thereof;

each illuminatable part of the peripheral illuminatable arrangement being illuminatable by a light emitter of a single colour or by a group of light emitters of different colours, the light emitters of such a group being activatable separately or as a group; and light emitters, such as LED's, that are optionally connected to said or a PCB by connectors such as by pairs of connectors.

Light emitters emitting light of different colours may be used to communicated different types of signals. For instance red may be used for transmitting a warning indication or an indication with a heat generation. Blue may be used for transmitting an indication relating to a cold state. Green may be used to indicate a state or readiness. Red or blue may be used to for communicating an indication to warm or cold beverage processing. Orange or yellow may be used to indicate a user-programmation mode or a service mode, e.g. for rinsing, cleaning or descaling the machine. Hence, intuitive colour codes may be used to transmit different indications to a user.

The illuminatable parts of the general peripheral illuminatable arrangement can be in a side-by-side linear arrangement around the inner portion, such as a curved and/or angled linear arrangement. For instance, the illuminatable parts of the general peripheral illuminatable arrangement are:

in a side-by-side single linear arrangement or in two or three or four generally parallel or concentric side-by-side linear arrangements; and/or in a side-by-side linear arrangement in which two neighbouring illuminatable parts are immediately adjacent to each other or spaced apart by a spacer such as a part of a housing.

The illumination of each illuminatable part may extend over substantially the entire part. Optionally the illumination of each part provides over the entire part a generally uniform light intensity and/or a generally uniform colour. The colour may be selected from white, yellow, orange, red, green, blue and pink, or a mixture of several such colours.

The control arrangement can have at least one configuration for successively activating consecutive parts, e.g. consecutive parts in a linear side-by-side arrangement, in a turning sequence about the inner portion, for instance:

a) in a clockwise and then in counter-clockwise turning sequence or in a counter-clockwise and then in a clockwise turning sequence;

b) with one or more repetitions of the turning sequence upon completion thereof; and/or c) with a changing pace over a turning sequence and/or between a plurality of successive turning sequences, for instance to indicate different steps of:

a beverage preparation procedure, e.g. successive steps of pre-wetting and of extraction; and/or a service procedure, e.g. successive steps of a descaling procedure.

Such a configuration can be used for indicating the performance of a cycle of any time, for instance a start-up cycle or a beverage preparation cycle or a cleaning cycle. In an advantageous embodiment, such a configuration is used to indicate a beverage preparation cycle by centrifugation, the peripheral illuminatable arrangement extending optionally around a centrifugation axis, centrifugation being indicated by the turning sequence, such as a plurality of repetitions of turning sequences symbolizing a centrifugation about the centrifugation axis.

The control arrangement may have at least one configuration for successively activating the consecutive parts in a turning sequence about the inner portion and deactivating all the parts simultaneously after activation of all the parts.

The control arrangement can have at least one configuration for successively activating the consecutive parts in a turning sequence about the inner portion while successively deactivating previously activated parts in the turning sequence. Optionally, the parts have an activation pace and a deactivation pace that are equal or different, such as an activation pace that is faster than the deactivation pace. At least two or three parts can be in an activated state simultaneously.

The control arrangement can have at least one configuration in which one part is intermittently activated and deactivated.

For instance, such a configuration can be associated with an error indication or an indication confirming an information acquisition by machine 1, e.g. confirming that a user-instruction via a user-selector has been properly acquired.

A plurality of such parts can be simultaneously activated and deactivated, such as a plurality of parts or groups of parts spaced apart, e.g. generally equally spaced apart, by permanently activated or deactivated parts about the inner portion.

Two of such parts can be activated and deactivated in alternation, such as a plurality of two parts can be activated and deactivated in alternation.

For instance, such a configuration can be associated with an expectation by machine 1 of an input by a user, e.g. via a user-selector, or of another action by a user.

The part(s) may be intermittently activated and deactivated at a constant frequency, for instance several parts can be intermittently activated and deactivated at a constant frequency.

Further to any of the above configurations, the control arrangement can have at least one further configuration for activating and deactivating parts at a faster pace than the above configuration(s).

For instance, different paces may be implemented to distinguish between executions of procedures of different types. For example, an execution of a start-up or a service (e.g. descaling) procedure may be indicated by one or more turning sequences at a relatively slow pace and a beverage preparation procedure may be indicated by one or more turning sequences at a relatively fast pace.

For instance, different paces may be implemented to distinguish between executions of different procedures of a same type, such as different beverage preparation procedures, e.g. a lungo or an expresso coffee, or different service procedures, e.g. a light or an intensive descaling procedure.

Further to the activatable and deactivatable part(s), at least one part can remain activated or deactivated permanently in any of the above configurations or further configurations.

The control arrangement may have at least one configuration in which at least one part, such as a single part or a group of neighbouring parts, is/are continuously activated.

The peripheral illuminatable arrangement may generally follow an elongated shape:

a) forming a curve, such as one or more circles and/or ellipses, or a section thereof;

b) forming a regular or irregular polygon or a section thereof, such as a triangle, a quadrangle e.g. a square or a rectangle or a trapeze or a parallelogram, a pentagon, an hexagon, an heptagon, an octagon, a nonagon, a decagon, a hendecagon or a dodecagon; and/or c) extending in the form of a stripe and/or in the form of discrete elements, such as discrete light emitters, e.g. LEDs or sections of illuminatable optical fibres, disposed generally along the elongated shape.

The control arrangement may comprise one or more configurations for controlling the generally peripheral illuminatable arrangement to indicate to a user:

an execution of a start-up procedure, such as the start-up of a heater, for instance by a configuration as described above, for instance a configuration of the type for successively activating consecutive parts such as consecutive parts in a linear side-by-side arrangement typically in a turning sequence about the inner portion(s) and optionally deactivating all the parts simultaneously after activation of all the parts;

a standby procedure, the interface providing an indication as to a duration needed for reaching readiness for beverage preparation, for instance by a configuration as described above, for instance a configuration in which at least one part, such as a single part or a group of neighbouring parts, is/are continuously activated;

an execution of a beverage preparation procedure, for instance by a configuration as described above, for instance by a configuration for successively activating consecutive parts in a turning sequence about the inner portion and either deactivating all the parts simultaneously after activation of all the parts or successively deactivating previously activated parts in the turning sequence while activating the parts, such as a beverage preparation procedure by centrifugation for instance by such an above mentioned configuration with one or more repetitions of the turning sequence upon completion thereof, e.g. the generally peripheral illuminatable arrangement surrounding an axis of centrifugation;

a status of readiness for receiving a user-instruction, for instance by a configuration as described above, for instance by a configuration in which at least one part is continuously activated, optionally all the parts being continuously activated;

an execution of a procedure of reading an information from a capsule, such as an ingredient capsule, or from a machine-interface, e.g. connected to a network or to a portable memory device, for instance by a configuration as described above, for instance by a configuration in which one part is intermittently activated and deactivated;

a status of error, for instance to indicate an ingredient shortage e.g. a water shortage, for instance by a configuration as described above, for instance by a configuration in which one part is intermittently activated and deactivated;

an activation of a user-programming mode, e.g. to set a parameter of a beverage preparation process or to set a timer for entering a standby or an autoshut-off process, for instance by a configuration as described above, for instance by a configuration in which at least one part is continuously activated;

an execution of a service procedure, such as a rinsing or cleaning or descaling or water material emptying procedure, for instance by a configuration as described above, for instance a configuration in which: consecutive parts are successively activated in a turning sequence about the inner portion with either all the parts being deactivated simultaneously after activation of all the parts or previously activated parts being successively deactivated in the turning sequence; one part is intermittently activated and deactivated; or at least one part is continuously activated; and a completed acquisition of a user-instruction, e.g. via a user-selector, for instance by a configuration as described above, for instance by a configuration in which one part is intermittently activated and deactivated, e.g. two or three times.

BRIEF DESCRIPTION OF THE DRAWINGS

The invention will now be described with reference to the schematic drawings, wherein:

FIGS. 2 to 4 illustrate different interfaces of polygonal shapes that can be implemented in a machine according to the invention;

FIG. 5 illustrates an interface of curved shape that can be implemented in a machine according to the invention.

DETAILED DESCRIPTION

Figure 6:
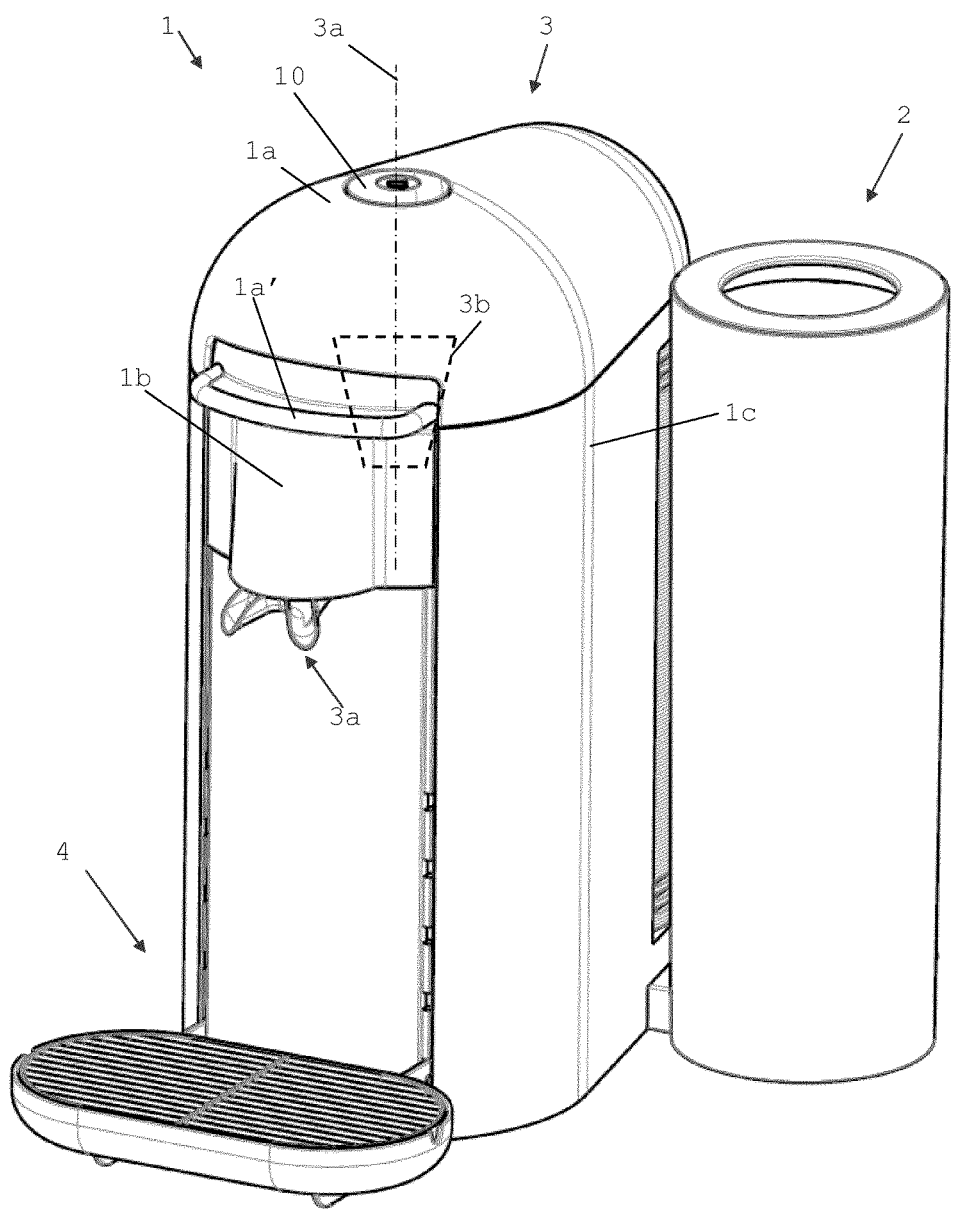
FIG. 6 illustrates a beverage preparation machine according to the invention.

FIGS. 1 to 5 illustrate different user-interfaces 10, 20, 30, 40, 50 for a beverage preparation machine 1 according to the invention. An example of beverage machine 1 provided with interface 10 is shown in FIG. 6.

Exemplary beverage preparation machine 1 may have a water source 2 and a beverage preparation unit 3. Water source 2 can be a water tank. Alternative, the machine's water source can include a connector that is directly connectable to the city water distribution system so that no manual refilling of any water tank of the beverage machine is needed.

Machine 1 may be configured for the preparation of hot or cold beverages. Machine 1 may be arranged for combining different ingredients, for instance a liquid carrier, such as water and/or milk, and one or more flavouring and/or texturing ingredients, such as chocolate, cacao, coffee, tea, milk, syrup, sugar, cream, emulsifier, dry or gel soup, etc. . . . . . The ingredients may be combined by mixing thereof or by infusion. Suitable machines are for instance disclosed in greater details in WO 2009/074550 and WO 2009/130099. In an advantageous embodiment, beverage machine 1 is of the type that combines the ingredient by centrifugation, for instance as disclosed in WO 2008/148601, WO 2008/148604, WO 2008/148646, WO 2008/148650, WO 2008/148656, WO 2009/106175, WO 2009/106598, WO 2010/063644, WO 2010/066736, WO 2010/089329, WO 2011/023711, PCT/EP13/077276 and PCT/EP13/077275. Hence, machine 1 may include an ingredient combination chamber 3b (typically located inside machine 1 and indicated in dotted line in FIG. 6), e.g. for housing an ingredient capsule, into which a liquid is injected and which undergoes centrifugation about a centrifugation axis 3a to combine the ingredient and the liquid. The ingredient combination chamber 3b can be opened and closed (for instance by actuating a handle 1a' e.g. to pivot or raise or lower top 1a) and, for combining the ingredients, rotated.

Beverage machine 1 typically has an outlet 3a that can be a single outlet or a dual outlet. Outlet 3a can be arranged to deliver a beverage to a dispensing area 4. Dispensing area 4 may be configured to receive a receptacle such as a glass, a cup or a mug. The dispensing area may be of any type, for instance as disclosed in EP 1 867 260 or in WO 2009/074557.

Figure 1:
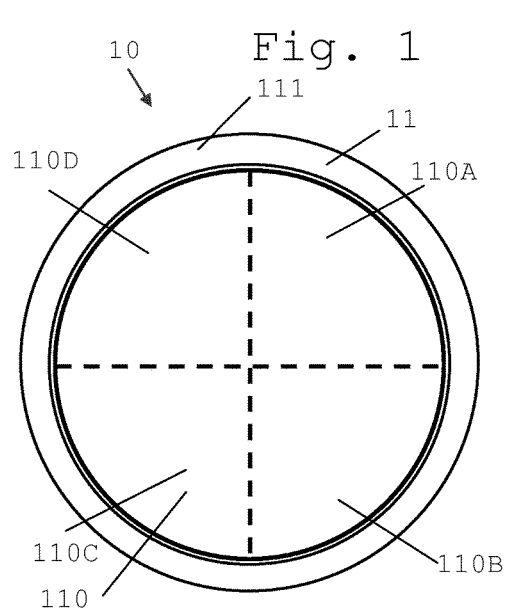
FIG. 1 schematically illustrates a round interface of a beverage preparation machine according to the invention.
Figure 1A:
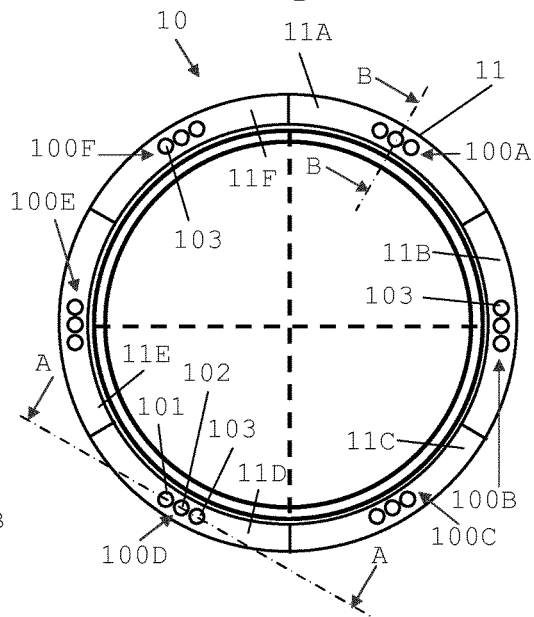
FIG. 1a shows is a horizontal cross-section of the interface of FIG. 1, FIGS. 1A and 1B illustrating enlarged cross-sectional views of the interface of FIGS. 1 and 1a along lines A-A and B-B, respectively.
Figure 1A:
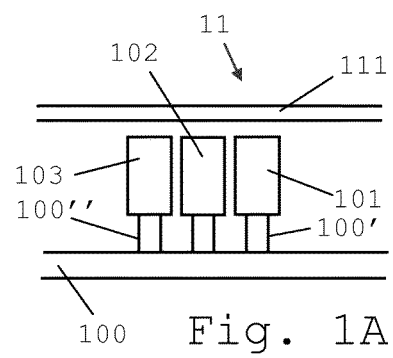
Figure 1B:
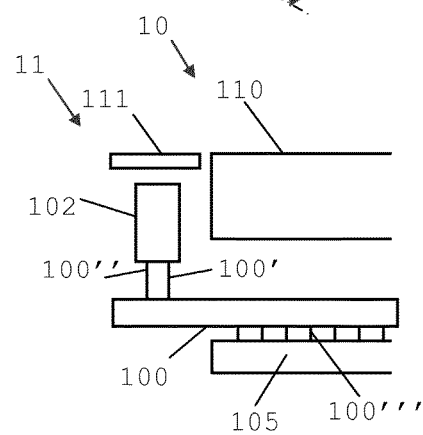
FIG. 1x illustrates a variation of an interface of a machine according to the invention.

Beverage machine 1 comprises a user-interface 10 which is illustrated in greater details in FIGS. 1, 1A and 1B. Alternatively, interface 10 could be substituted by any of interfaces 10', 20, 30, 40, 50 illustrated in FIGS. 1x to 5 or by variations thereof encompassed by the scope of the invention.

User-interfaces 10, 10', 20, 30, 40, 50 all have:

a generally peripheral illuminatable arrangement 11, 11', 21, 31, 41, 51 formed of illuminatable parts 11A, 11B, 11C, 11D, 11E, 11F, 11A', 11B', 11C', 11D', 11E', 11F', 11G', 11H', 21A, 21B, 21C, 21D, 21E, 21F, 21G, 31A, 31B, 31C, 31D, 31E, 31F, 41A, 41B, 51A, 51B, 51C, 51D, 51E, 51F, 51G, 51H, 51X and extending around an inner portion 110, 120; and a control arrangement 100, 105 for activating and deactivating an illumination of illuminatable parts 11A-11F, 11A'-11H', 21A-21G, 31A-31F, 41A-41B, 51A-51X, 51X, e.g. a programmable control arrangement, such as a control arrangement 100, 105 comprising a printed circuit board PCB 100 and a controller 105 e.g. a controller connected to the PCB by connectors 100'''.

Control arrangement 100, 105 may control other functions of such machine 1 such as an IT module, a pump, a thermal conditioner and/or motorization of a beverage preparation unit 3.

In a typical embodiment, user-interface 10, 10', 20, 30, 40, 50 is on a top part 1a or a front part 1b or a side part 1c of such machine 1. In FIG. 6, for instance, user-interface 10 is provided on top part 1a of machine 1.

Control arrangement 100, 105 may incorporate at least one configuration, e.g. a programmed configuration, for activating only part of illuminatable parts 11A-11F, 11A'-11H', 21A-21G, 31A-31F, 41A-41B, 51A-51H, 51X.

Figure 1X:
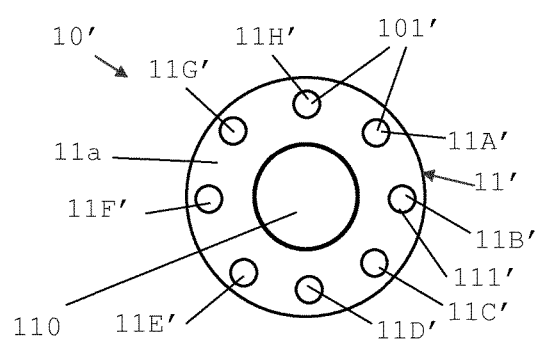

As for instance illustrated in FIG. 1x, the illuminatable parts can include one or more illuminatable spots 11A'-11H', such as round or polygonal spots, positioned along the generally peripheral illuminatable arrangement 11'. As for example illustrated in FIGS. 1, 2, 3, 4 and 5 the illuminatable parts can have one or more elongated segments 11A-11F, 21A-21G, 31A-31F, 41A-41B, 51A-51H, 51X extending along generally peripheral illuminatable arrangement 11, 21, 31, 41, 51.

Such elongated segment(s) can be selected from segments that are:

curved segments 11A-11F, 51A-51X, such as segments that extend generally along a circular sector 11A-11F (FIG. 1) and/or segments that extend generally along an elliptic sector 51A-51X (FIG. 6);

straight segments 21A, 21C, 21E, 21F, 21G, 31B, 21C, 21D, 21E (FIGS. 2 to 4);

angled segments 21B, 21D, 31A, 31G, 41A, 41B (FIGS. 2 to 4);

segments that extend along an entire straight side 21A, 21B, 31A, 41A, 41B of peripheral illuminatable arrangement 21, 31, 41 (FIGS. 2 to 4);

angled segments that extend along a plurality of straight sides 21B, 31A, 41A, 41B of peripheral illuminatable arrangement 21, 31, 41, such as angled segments that extend over an entire straight side 21B, 31A, 41A, 41B and/or over less than an entire straight side 21D, 31A, 31F, 41A, 41B of peripheral illuminatable arrangement 21, 31, 41 and/or segments that extend along only two straight sides 21B, 21D, 31F, 41A, 41B and/or along more than two sides 31A of peripheral illuminatable arrangement 21, 31, 41 (FIGS. 2 to 4);

segments that extend over a fraction of an overall length of peripheral illuminatable arrangement 11, 21, 31, 41, 51, which fraction corresponds to about a half 31A, 41A, 41B (FIGS. 3 and 4) or a third 21B (FIG. 2) or a fourth 31F (FIG. 3) or a fifth or a sixth 11A-11F, 21A, 21D (FIGS. 1 and 2) or a seventh or an eight 31B (FIG. 3) or a ninth 51A-51X (FIG. 5) or a tenth or a twelfth 21C, 21E, 21F, 21G (FIG. 2) or a twenty-fourth 31C, 31D, 31E (FIG. 3) of the overall length of the peripheral illuminatable arrangement; and combinations thereof, for instance a peripheral illuminatable arrangement that is made of segments of different lengths (FIGS. 2 to 5) or of segments of the same length (FIG. 1) and/or that is made of a combination of curved segments and straight segments (not shown).

Peripheral illuminatable arrangement 11, 11', 21, 31, 41, 51 may extend around a single inner portion 110 (FIGS. 1 to 4) or several inner portions 110, 120. For instance such arrangement extends around a pair of inner portions 110, 120 for instance so that the peripheral illuminatable arrangement 51 is generally 8-shaped (FIG. 5).

A single inner portion 110 can be made of several sections such as a plurality of active interface parts 110A, 110B, 110C, 110D (FIGS. 1 and 2) or a plurality of inactive interface parts or a combination of at least one active interface part 110E and at least one inactive interface part 110F (FIG. 4), such as active interface part(s) in the form of user-selector(s) and/or inactive user-interface part(s) in the form of housing section(s).

The inner portion can be selected from: an active part 110, such as a selector 110E or a plurality of selectors 110A, 110B, 110C, 110D, for instance in the form of one or more push-buttons; and/or a passive part 110F, 120 such as a housing section.

User-selector(s) 110, 110A, 110B, 110C, 110D, 110E are typically connected to controller 105 or PCB 100 and can be arranged to receive user-instructions such as instructions for initiating a beverage preparation with certain characteristics, e.g. a desired volume and/or intensity and/or taste of the beverage to be produced, or for carrying out a service procedure, e.g. rinsing or cleaning or descaling, or for switching on or off machine 1 or for entering a user-programming mode. User-selector 110, 110A, 110B, 110C, 110D, 110E may be configured to take user-instructions only or may be further configured to indicate an information to a user, e.g. the user-selector may itself also be provided with a light emitting arrangement that is controlled by controller 105. For instance, user-selector is illuminatable according to whether or not a function associated with the selector is available at a given point in time of use of machine 1. For instance, during a descaling process, it will not be possible to initiate a beverage preparation process. This can be indicated by proper illumination of the corresponding user-selector(s). This does not mean to say the a user cannot order a beverage during a service procedure but that to carry out the beverage preparation order, either the service procedure needs to be interrupted or carried out to its end. For instance, the controller may store a particular user-request for carrying it out later when machine 1 is in a state in which the user-request can be carried out. See for instance WO 2011/020779 for an example of delayed execution of a stored user-request. It is of course also possible to configure the machine so that it accepts no input for carrying out a specific process as long as such a process cannot be carried out.

Peripheral illuminatable arrangement 11, 11', 21, 31, 41, 51 may include one or more of the following features:

- a light spreading window 111 such as a translucent window for spreading light emitted by light emitter(s) 101, 102, 103 (FIGS. 1, 1A and 2B);
- a light transmitting window 111' such as a transparent window for revealing a shape of the light emitter 101' to a user (FIG. 2x);
- a plurality of light emitters 101, 101',102, 103 comprising light emitters 101' of a single colour or light emitters 101, 102, 103 (FIGS. 1a and 1A) of different colours, such as groups 100A, 100B, 100C, 100D, 100E, 100F of light emitters 101, 102, 103 of different colours, for instance colours selected from white, yellow, orange, red, green, blue and pink, and mixture thereof;
- each illuminatable part 11A-11F, 11A'-11H', 21A-21G, 31A-31F, 41A-41B, 51A-51H, 51X of peripheral illuminatable arrangement 11, 11', 21, 31, 41, 51 being illuminatable by a light emitter 101' of a single colour or by a group 100A, 100B, 100C, 100D, 100E, 100F of light emitters 101, 102, 103 of different colours, the light emitters of such a group being activatable separately or as a group; and
- light emitters 101', 101, 102, 103, such as LED's, that are optionally connected to said or a PCB 100 by connectors 100', 100" such as by pairs of connectors 100', 100" (FIGS. 1a, 1A and 1B).

Illuminatable parts 11A-11F, 11A'-11H', 21A-21G, 31A-31F, 41A-41B, 51A-51H, 51X of peripheral illuminatable arrangement 11, 11', 21, 31, 41, 51 can be in a side-by-side linear arrangement around inner portion 110, 120, such as a curved arrangement (FIGS. 1 to 1x and 5) and/or angled linear arrangement (FIGS. 2 to 4). Such illuminatable parts can be:

- in a side-by-side single linear arrangement 11A-11F, 11A'-11H', 21A-21G, 31A-31F, 41A-41B, 51A-51H, 51X (FIGS. 1 to 5) or in two or three or four generally parallel side-by-side linear arrangements; and/or
- in a side-by-side linear arrangement 11A-11F, 11A'-11H', 21A-21G, 31A-31F, 41A-41B, 51A-51H, 51X in which two neighbouring illuminatable parts are immediately adjacent to each other 11A-11F, 21A-21G, 31A-31F, 41A-41B, 51A-51H, 51X (FIGS. 1, 2, 3, 4 and 5) or spaced apart 11A'-11H' by a spacer such as a part of a housing 11a (FIG. 1x).

The illumination of an illuminatable part 11A-11F, 11A'-11H', 21A-21G, 31A-31F, 41A-41B, 51A-51H, 51X may extend over substantially the entire part. Optionally, the illumination of such a part 11A-11F, 11A'-11H', 21A-21G, 31A-31F, 41A-41B, 51A-51H, 51X provides over the entire part a generally uniform light intensity and/or a generally uniform colour, such as a colour selected from white, yellow, orange, red, green, blue and pink, or a colour resulting from a mixture of several such colours.

Control arrangement 100, 105 can have at least one configuration for successively activating consecutive parts 11A-11F, 11A'-11H', 21A-21G, 31A-31F, 41A-41B, 51A-51H, 51X, e.g. consecutive parts in a linear side-by-side arrangement, in a turning sequence about inner portion 110, 120. Optionally, the successive activation is performed:

a) in a clockwise and then in counter-clockwise turning sequence or in a counter-clockwise and then in a clockwise turning sequence;
b) with one or more repetitions of the turning sequence upon completion thereof; and/or
c) with a changing pace over a turning sequence and/or between a plurality of successive turning sequences, for instance to indicate different steps of:
- a beverage preparation procedure, e.g. successive steps of pre-wetting and of extraction; and/or
- a service procedure, e.g. successive steps of a descaling procedure.

Such a configuration can be used for indicating the performance of a cycle of any time, for instance a start-up cycle or a beverage preparation cycle or a cleaning cycle. In an advantageous embodiment, such a configuration is used to indicate a beverage preparation cycle by centrifugation, the peripheral illuminatable arrangement extending optionally around a centrifugation axis 3a, centrifugation being indicated by the turning sequence, such as a plurality of repetitions of turning sequences symbolizing a centrifugation about centrifugation axis 3a.

Control arrangement 100, 105 may have at least one configuration for successively activating consecutive parts 11A-11F, 11A'-11H', 21A-21G, 31A-31F, 41A-41B, 51A-51H, 51X in a turning sequence about inner portion 110, 120 and deactivating all the parts simultaneously after activation of all the parts.

Control arrangement 100, 105 may have at least one configuration for successively activating consecutive parts 11A-11F, 11A'-11H', 21A-21G, 31A-31F, 41A-41B, 51A-51H, 51X in a turning sequence about inner portion 110, 120 while successively deactivating previously activated parts in the turning sequence. The parts can have an activation pace and a deactivation pace that are equal or different, such as an activation pace that is faster than the deactivation pace. At least two or three parts may be in an activated state simultaneously.

Control arrangement 100, 105 can have at least one configuration in which one part 11A-11F, 11A'-11H', 21A-21G, 31A-31F, 41A-41B, 51A-51H, 51X is intermittently activated and deactivated.

For instance, such a configuration can be associated with an error indication or an indication confirming an information acquisition by machine 1, e.g. confirming that a user-instruction via a user-selector has been properly acquired.

A plurality of such parts 11A-11F, 11A'-11H', 21A-21G, 31A-31F, 41A-41B, 51A-51H, 51X may be simultaneously activated and deactivated. For example, a plurality of parts or groups of parts are spaced apart about inner portion 110, 120 by other permanently activated or deactivated parts. Such parts or groups of parts are for instance generally equally spaced apart about inner portion 110, 120.

Two of such parts 11A-11F, 11A'-11H', 21A-21G, 31A-31F, 41A-41B, 51A-51H, 51X can be activated and deactivated in alternation. For instance, two parts are activated and deactivated in alternation.

For instance, such a configuration can be associated with an expectation by machine 1 of an input by a user, e.g. via a user-selector, or of another action by a user.

Such part(s) 11A-11F, 11A'-11H', 21A-21G, 31A-31F, 41A-41B, 51A-51H, 51X can be intermittently activated and deactivated at a constant frequency. For instance, several parts are intermittently activated and deactivated at a constant frequency.

Further to such configuration(s), control arrangement 100, 105 can have at least one other configuration for activating and deactivating parts 11A-11F, 11A'-11H', 21A-21G, 31A-31F, 41A-41B, 51A-51H, 51X at a faster pace than the above configuration(s).

For instance, different paces may be implemented to distinguish between executions of procedures of different types. For example, an execution of a start-up or a service (e.g. descaling) procedure may be indicated by one or more turning sequences at a relatively slow pace and a beverage preparation procedure may be indicated by one or more turning sequences at a relatively fast pace.

For instance, different paces may be implemented to distinguish between executions of different procedures of a same type, such as different beverage preparation procedures, e.g. a lungo or an expresso coffee, or different service procedures, e.g. a light or an intensive descaling procedure.

Further to the activatable and deactivatable part(s), at least one part may remain activated or deactivated permanently in the above configuration(s) or in the above further configuration.

For instance, a non-blocking warning, such as an ingredient (e.g. water) availability nearing a minimum level, may be indicated by a permanently active part.

Another example of a non-blocking warning can relate to the need to perform a service (e.g. descaling) process within a short period of time.

Control arrangement 100, 105 can have at least one configuration in which at least one part, such as a single part 11A-11F, 11A'-11H', 21A-21G, 31A-31F, 41A-41B, 51A-51H, 51X or a group of neighbouring parts, is/are continuously activated.

Peripheral illuminatable arrangement 11, 11', 21, 31, 41, 51 may generally follow an elongated shape:
a) forming a curve 11, 11', such as one or more circles 11,11' (FIGS. 1, 1a and 1x) and/or ellipses 51 (FIG. 5), or a section thereof;
b) forming a regular or irregular polygon 21, 31, 41 or a section thereof, such as a triangle 41 (FIG. 4), a quadrangle 31 e.g. a square 31 (FIG. 3) or a rectangle or a trapeze or a parallelogram, a pentagon, an hexagon 21 (FIG. 2), an heptagon, octagon 11' (FIG. 1x), nonagon, a decagon, a hendecagon or a dodecagon;
c) extending in the form of a stripe 11, 21, 31, 41, 51 (FIGS. 1, 2-5) and/or in the form of discrete elements 11' (FIG. 1x), such as discrete light emitters, e.g. LEDs 101' or sections of illuminatable optical fibres, disposed generally along the elongated shape; or
d) combining at least two of features a), b) and c), such as a peripheral illuminatable arrangement formed of a curved portion and of a straight or angled portion.

Control arrangement 100, 105 may comprise one or more configurations for controlling the generally peripheral illuminatable arrangement 11, 11', 21, 31, 41, 51 to indicate to a user:
an execution of a start-up procedure, such as the start-up of a heater, for instance by a configuration as described above, for instance a configuration of the type for successively activating consecutive parts such as consecutive parts in a linear side-by-side arrangement typically in a turning sequence about the inner portion(s) and optionally deactivating all the parts simultaneously after activation of all the parts;
a standby procedure, the interface providing an indication as to a duration needed for reaching readiness for beverage preparation, for instance by a configuration as described above, for instance a configuration in which at least one part, such as a single part or a group of neighbouring parts, is/are continuously activated;
an execution of a beverage preparation procedure, for instance by a configuration as described above, for instance by a configuration for successively activating consecutive parts in a turning sequence about the inner portion and either deactivating all the parts simultaneously after activation of all the parts or while successively deactivating previously activated parts in the turning sequence, such as a beverage preparation procedure by centrifugation for instance by such an above mentioned configuration with one or more repetitions of the turning sequence upon completion thereof, e.g. the generally peripheral illuminatable arrangement surrounding an axis of centrifugation;
a status of readiness for receiving a user-instruction, for instance by a configuration as described above, for instance by a configuration in which at least one part is continuously activated, optionally all the parts being continuously activated;
an execution of a procedure of reading an information from a capsule, such as an ingredient capsule, or from a machine-interface, e.g. connected to a network or to a portable memory device, for instance by a configuration as described above, for instance by a configuration in which one part is intermittently activated and deactivated;
a status of error, for instance to indicate an ingredient shortage e.g. a water shortage, for instance by a configuration as described above, for instance by a configuration in which one part is intermittently activated and deactivated;
an activation of a user-programming mode, e.g. to set a parameter of a beverage preparation process or to set a timer for entering a standby or an autoshut-off process, for instance by a configuration as described above, for instance by a configuration in which at least one part is continuously activated;
an execution of a service procedure, such as a rinsing or cleaning or descaling or water material emptying procedure, for instance by a configuration as described above, for instance a configuration in which: consecutive parts are successively activated in a turning sequence about the inner portion with either all the parts being deactivated simultaneously after activation of all the parts or previously activated parts being successively deactivated in the turning sequence; one part is intermittently activated and deactivated; or at least one part is continuously activated; and
a completed acquisition of a user-instruction, e.g. via a user-selector 110, 110A, 110B, 110C, 110D, for instance by a configuration as described above, for instance by a configuration in which one part 11A-11F, 11A'-11H', 21A-21G, 31A-31F, 41A-41B, 51A-51H, 51X is intermittently activated and deactivated, e.g. two or three times.

The invention claimed is:

1. A beverage preparation machine comprising a housing that comprises a water source, a beverage preparation unit, and an outlet for delivering a beverage to a beverage dispensing area, the beverage preparation unit comprising a chamber inside the housing configured for holding an ingredient capsule into which a liquid is injected by the machine, the machine is configured to centrifuge the chamber about a centrifugation axis to combine the ingredient and the liquid, the beverage preparation machine further comprising a user-interface provided on the housing, the user-interface comprising:
a generally peripheral illuminatable arrangement formed of illuminatable parts and extending around an inner portion of the user-interface;
a control arrangement for activating and deactivating an illumination of the illuminatable parts comprising a printed circuit board PCB and a controller, wherein the illuminatable parts of the generally peripheral illuminatable arrangement are in a side-by-side linear arrangement around the inner portion of the user-interface; and the control arrangement has at least one configuration for activating only part of the illuminatable parts.

2. The machine of claim 1, wherein the illuminatable parts have one or more spots positioned along the generally peripheral illuminatable arrangement and/or one or more elongated segments extending along the generally peripheral illuminatable arrangement, the one or more elongated segments selected from the group consisting of:
curved segments;
straight segments;
angled segments;
segments that extend along an entire straight side of the peripheral illuminatable arrangement;
angled segments that extend along a plurality of straight sides of the peripheral illuminatable arrangement; and
segments that extend over a fraction of an overall length of the peripheral illuminatable arrangement.

3. The machine of claim 1, wherein the inner portion of the user-interface is an active portion or a passive portion.

4. The machine of claim 1, wherein the generally peripheral illuminatable arrangement comprises a feature selected from the group consisting of:
a light spreading window;
a light transmitting window;
a plurality of light emitters;
each illuminatable part of the peripheral illuminatable arrangement being illuminatable by a light emitter; and
light emitters.

5. The machine of claim 1, wherein the illumination of one or more of the illuminatable parts extends over substantially an entirety of the one or more of the illuminatable parts.

6. The machine of claim 1, wherein the control arrangement has at least one configuration for successively activating consecutive illuminatable parts.

7. The machine of claim 6, wherein the control arrangement has at least one configuration for successively activating the consecutive illuminatable parts in a turning sequence about the inner portion of the user-interface and deactivating all the consecutive illuminatable parts simultaneously after activation of all the consecutive illuminatable parts.

8. The machine of claim 6, wherein the control arrangement has at least one configuration for successively activating the consecutive illuminatable parts in a turning sequence about the inner portion of the user-interface while successively deactivating previously activated illuminatable parts in the turning sequence.

9. The machine of claim 1, wherein the control arrangement has at least one configuration in which one illuminatable part is intermittently activated and deactivated.

10. The machine of claim 6, wherein the control arrangement has at least one further configuration for activating and deactivating illuminatable parts at a faster pace than one or more configurations.

11. The machine of claim 6, wherein further to the activatable and deactivatable illuminatable parts, at least one part remaining activated or deactivated permanently in the at least one configuration or the at least one further configuration.

12. The machine of claim 1, wherein the control arrangement has at least one configuration in which at least one illuminatable part is continuously activated.

13. The machine of claim 1, wherein the peripheral illuminatable arrangement generally follows an elongated shape selected from the group consisting of:
forming a curve;
forming a regular or irregular polygon;
extending in the form of a stripe; and
at least two of the above shapes.

14. The machine of claim 1, wherein the control arrangement comprises one or more configurations for controlling the generally peripheral illuminatable arrangement to indicate to a user an activity selected from the group consisting of:
an execution of a start-up procedure;
a standby procedure;
an execution of a beverage preparation procedure;
a status of readiness for receiving a user-instruction;
an execution of a procedure of reading an information from a capsule;
a status of error;
an activation of a user-programming mode;
an execution of a service procedure; and
a completed acquisition of a user-instruction.

15. The machine of claim 1, wherein the illuminatable parts comprise at least one round or polygonal spot.

16. The machine of claim 1, wherein the machine is configured to open and close a chamber for housing an ingredient capsule, the beverage preparation unit comprises the chamber.

* * * * *